US009263984B2

(12) United States Patent
Hatakeyama et al.

(10) Patent No.: US 9,263,984 B2
(45) Date of Patent: Feb. 16, 2016

(54) AIR-CONDITIONING APPARATUS

(75) Inventors: Kazunori Hatakeyama, Tokyo (JP); Kazunori Sakanobe, Tokyo (JP); Shinya Matsushita, Tokyo (JP); Tsutomu Makino, Aichi (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 873 days.

(21) Appl. No.: 13/383,090

(22) PCT Filed: Mar. 4, 2010

(86) PCT No.: PCT/JP2010/001517
§ 371 (c)(1),
(2), (4) Date: Jan. 9, 2012

(87) PCT Pub. No.: WO2011/018863
PCT Pub. Date: Feb. 17, 2011

(65) Prior Publication Data
US 2012/0111043 A1 May 10, 2012

(30) Foreign Application Priority Data

Aug. 10, 2009 (JP) ................. 2009-185841

(51) Int. Cl.
*F04C 29/04* (2006.01)
*H02P 29/00* (2006.01)
(Continued)

(52) U.S. Cl.
CPC .......... *H02P 29/005* (2013.01); *F04C 29/0085* (2013.01); *F04C 29/04* (2013.01);
(Continued)

(58) Field of Classification Search
CPC ............... F04C 29/04; F04C 29/0085; F04C 2270/701; F04C 2270/10; F04C 2240/403; F04C 29/045; F04C 15/0096; F25B 49/025; F25B 2600/021; H02M 7/53875; H02M 2001/0022; Y02B 30/741; F04B 53/08; F04B 39/06; H02P 29/0055
See application file for complete search history.

(56) References Cited

U.S. PATENT DOCUMENTS 6,704,212 B2 * 3/2004 Furukawa et al. .............. 363/41
2004/0109771 A1 6/2004 Ioi et al.
(Continued)

FOREIGN PATENT DOCUMENTS

JP 60-68341 U 5/1985
JP 61-91445 A 5/1986
(Continued)

OTHER PUBLICATIONS

Chinese Office Action (Text Portion of the Notification of the First Office Action) dated Aug. 23, 2013, issued by the Chinese Patent Office in corresponding Chinese Patent Application No. 201080035406.3, and English language translation of Office Action. (11 pages).

(Continued)

*Primary Examiner* — Bryan Lettman
(74) *Attorney, Agent, or Firm* — Buchanan Ingersoll & Rooney PC

(57) ABSTRACT

A high efficiency refrigerant compressor standby heating method reduces vibrations and noise in a bearing of the compressor. The compressor comprises a motor, an inverter, an inverter controller, and a bus voltage detector to detect a bus voltage of the inverter. The inverter controller includes a dormant refrigerant detector to detect a dormant state of refrigerant in the compressor, a high-frequency AC voltage generator to output a high-frequency AC voltage command, which is out of a range of an operating frequency when the compressor is running, to a coil of the motor on the basis of an output of the dormant refrigerant detector, an amplitude, and a phase. A pulse width modulation signal generator to cause the inverter to generate a high-frequency AC voltage by generating a signal on the basis of the output of the high-frequency AC voltage generator and the output of the bus voltage detector.

16 Claims, 11 Drawing Sheets

(51) Int. Cl.
*F04C 29/00* (2006.01)
*F25B 49/02* (2006.01)
*H02M 7/5387* (2007.01)
*H02M 1/00* (2007.01)

(52) U.S. Cl.
CPC .......... *F04C 29/045* (2013.01); *F25B 49/025* (2013.01); *H02M 7/53875* (2013.01); *H02P 29/0055* (2013.01); *F04C 2240/403* (2013.01); *F04C 2270/10* (2013.01); *F04C 2270/701* (2013.01); *F25B 2600/021* (2013.01); *H02M 2001/0022* (2013.01); *Y02B 30/741* (2013.01)

(56) References Cited

U.S. PATENT DOCUMENTS

| | | | | |
|---|---|---|---|---|
| 2005/0074339 | A1* | 4/2005 | Asa et al. | 417/212 |
| 2007/0122297 | A1* | 5/2007 | Sato et al. | 417/410.3 |

FOREIGN PATENT DOCUMENTS

| | | | | | |
|---|---|---|---|---|---|
| JP | 8-226714 | A | | 9/1996 | |
| JP | 08226714 | | * | 9/1996 | ............ F25B 1/00 |
| JP | 8-261571 | A | | 10/1996 | |
| JP | 11-159467 | A | | 6/1999 | |
| JP | 2004-183499 | A | | 7/2004 | |
| JP | 2005210793 | | * | 4/2005 | ............ F24F 11/02 |
| JP | 2005-210793 | A | | 8/2005 | |
| JP | 2009-131118 | A | | 6/2009 | |

OTHER PUBLICATIONS

International Search Report (PCT/ISA/210) issued on May 11, 2010, by Japanese Patent Office as the International Searching Authority for International Application No. PCT/JP2010/001517.

Written Opinion (PCT/ISA/237) issued on May 11, 2010, by Japanese Patent Office as the International Searching Authority for International Application No. PCT/JP2010/001517.

Japanese Office Action dated Aug. 30, 2011 in corresponding Japanese Application No. 2009-185841, and english translation thereof.

Office Action (Patent Examination Report No. 1) dated Nov. 7, 2012, issued by the Australian Patent Office in the corresponding Australian Patent Application No. 2010283408. (4 pages).

Jun. 29, 2015 extended European Search Report issued in European Application No. 10808051.6.

* cited by examiner

F I G. 7
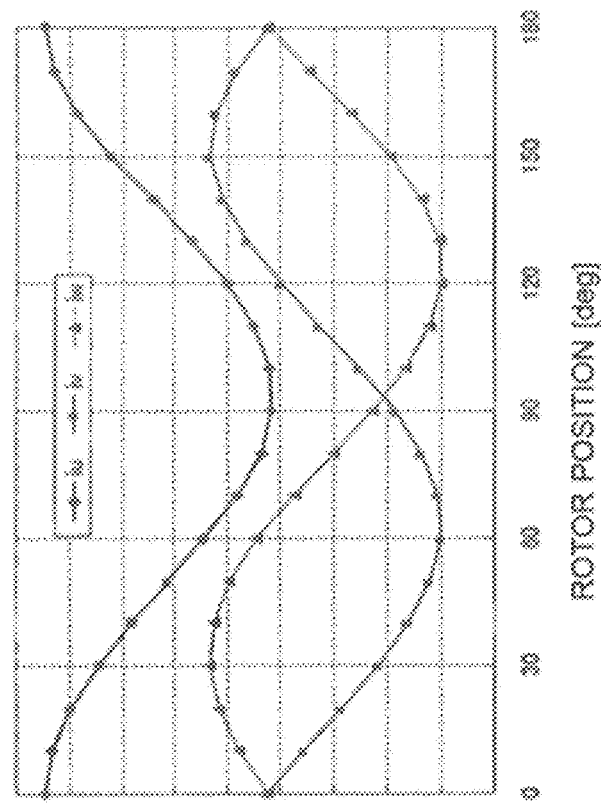
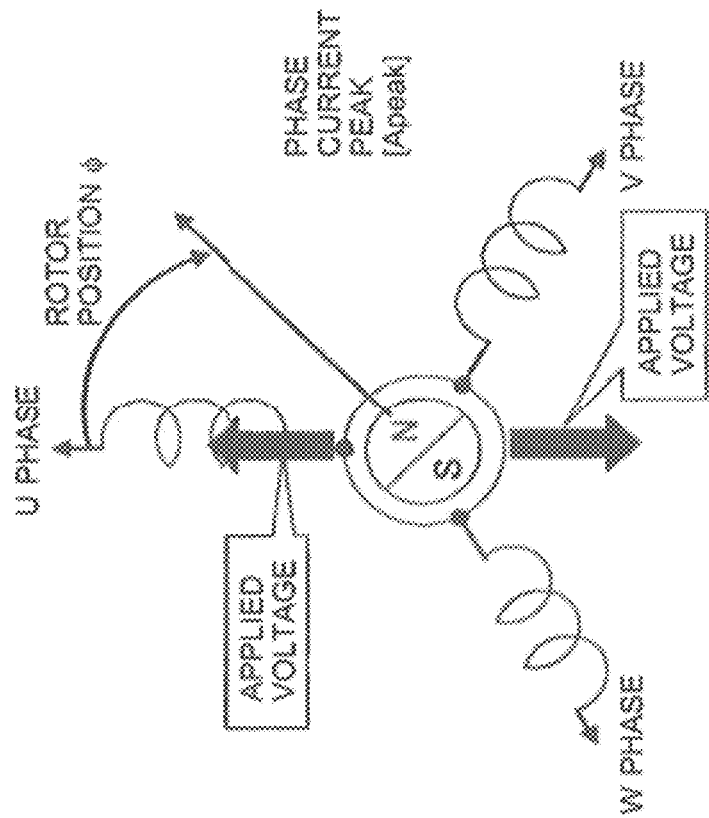

AIR-CONDITIONING APPARATUS

TECHNICAL FIELD

The present invention relates to a heating method of a compressor used in an air-conditioning apparatus.

BACKGROUND ART

An air-conditioning apparatus in the related art is configured so as to prevent liquid compression of liquid refrigerant that has stagnated in the compressor while the compressor is stopped by outputting a signal when the amount of liquid refrigerant stagnating in the compressor increases to a predetermined value or larger and with a control unit distributing a weak high-frequency open-phase current to a motor coil to warm up the motor coil upon input of the signal. Liquid compression caused by starting the operation while the refrigerant is in a dormant state, that is, in a state in which the stagnating liquid refrigerant in the compressor is at a low temperature, is prevented and thus damage of the compressor is prevented (for example, see PTL 1).

There is also a configuration in which sufficient preheating is achieved with minimum electrical current consumption by periodically inverting the direction of current flowing through a stator coil of a motor by means of controlling an ON/OFF cycle of a switching element to generate heat not only by conventional resistance loss but also by hysteresis loss and, furthermore, by reducing the number of switching operations per unit time, thereby improving power efficiency (for example, see PTL 2).

CITATION LIST

Patent Literature

PTL 1: Japanese Unexamined Patent Application Publication No. 8-226714 (pp. 1-3, FIGS. 1 to 2)
PTL 2: Japanese Unexamined Patent Application Publication No. 11-159467 (p. 3, pp. 5-6, FIGS. 1 to 6)

SUMMARY OF INVENTION

Technical Problem

However, as regards the related art described in PLT 1, since an open-phase current is used, there are coils in which no current flows, and thus uniform heating of the compressor cannot be achieved. Further, when an attempt is made to flow the open-phase current through a permanent-magnet synchronous motor having a salient pole ratio with an inverter, because the winding inductance has a rotor-position-dependency, in some cases, the current flows through all the phases depending on the position of a rotor, and thus there is a problem in that it is difficult to circulate the open-phase current.

Also, as regards the related art described in PLT 2, because one of the switching elements connected at one end to the power source side is turned ON and OFF repeatedly at a predetermined cycle during a predetermined period; simultaneously, two of the switching elements connected at one end to the ground side are kept in an ON state for the predetermined period; and then the direction of the current flowing through the stator coil is inverted, the frequency of the current applied to the coil cannot be raised to a high level causing limitation of iron loss by the raised frequency, and hence improvement of efficiency will be hindered. Furthermore, the ON/OFF frequency that is substantially the same as those which are grate on the ear of people occurs creating a noise problem.

The invention was made to solve the above problem and to comply with the Directive on Eco-Design of Energy-using Produces and Australian MEPS (Minimum Energy Performance Standards) which are recent design standards with strict environmental consideration. And it is an object of the present invention to obtain a refrigerant heating method with high efficiency during standby and reduction of vibrations and noises of a bearing in the compressor.

Solution to Problem

An air-conditioning apparatus according to the present invention includes: a compressor to compress refrigerant; a motor to drive the compressor; an inverter to apply a desired voltage to the motor; inverter control means to control the inverter; and bus voltage detecting means to detect a bus voltage which is a power source of the inverter, in which the inverter control means includes: dormant refrigerant detecting means to detect a dormant state of refrigerant in the compressor; high-frequency AC voltage generating means to output a high-frequency AC voltage command that is out of a range of an operating frequency when the motor is undergoing compression operation to two-phase or three-phase of a coil of the motor on the basis of an output of the dormant refrigerant detecting means and an amplitude and a phase input from the outside; and PWM signal generating means to cause the inverter to generate a high-frequency AC voltage by generating a PWM signal and outputting of the same to the inverter on the basis of the output of the high-frequency AC voltage generating means and the output of the bus voltage detecting means, and in which when the PWM signal generating means produces an output of the PWM signal to the inverter, the refrigerant in the compressor is heated by iron loss and copper loss in the motor.

Advantageous Effects of Invention

According to the present invention, because the high-frequency AC voltage generating means outputs a frequency component that is out of range of the operating frequency when the motor is undergoing compression operation, the mechanical vibration from the compressor at the time of heating is suppressed, and abrasion and noise of a bearing are suppressed. Also, the PWM generating means causes iron loss in the motor of the compressor by generating a high-frequency current, enabling heating of the motor with high efficiency.

BRIEF DESCRIPTION OF DRAWINGS

FIG. 7 is a drawing illustrating the change of current according to the position of a rotor of an IPM motor.

DESCRIPTION OF EMBODIMENTS

Embodiment 1

Figure 1:
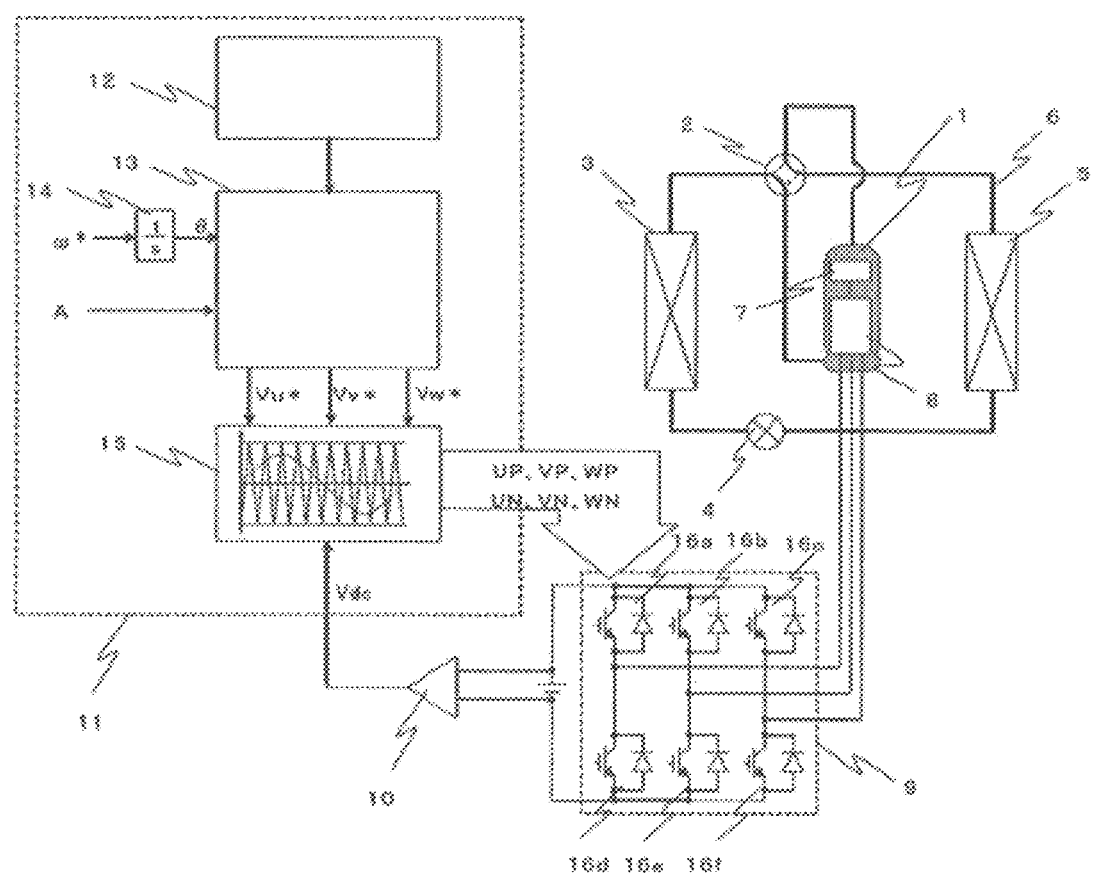
FIG. 1 is a drawing showing a configuration of an air-conditioning apparatus according to Embodiment 1 of the present invention.

FIG. 1 is a drawing showing a configuration of an air-conditioning apparatus according to Embodiment 1 of the present invention.

In FIG. 1, a compressor 1, a four-way valve 2, an outdoor heat exchanger 3, an expansion valve 4, and an indoor heat exchanger 5 are connected with refrigerant piping 6 to form a refrigeration cycle, constituting a split-type air-conditioning apparatus. Provided in the interior of the compressor 1 is a compression mechanism 7 to compress refrigerant and a motor 8 to drive the compressing mechanism 7. An inverter 9 to provide the motor 8 with voltage and to drive the motor 8 is electrically connected to the motor 8, and includes bus voltage detecting means 10 to detect a bus voltage Vdc that is a source voltage of the inverter 9. A control input end of the inverter 9 is connected to inverter control means 11. Provided in the interior of the inverter control means 11 are dormant refrigerant detecting means 12, high-frequency AC voltage generating means 13, an integrator 14, and PWM signal generating means 15.

These are implemented by a microcomputer or a DSP executing a control program in a memory.

The inverter 9 includes switching elements 16a to 16f in bridge connection and, on the basis of PWM signals (UP, VP, WP, UN, VN, WN) sent from the inverter control means 11, drives the respective switching elements (UP drives 16a, VP drives 16b, WP drives 16c, UN drives 16d, VN drives 16e, and WN drives 16f). In the inverter control means 11, when the dormant refrigerant detecting means 12 detects that the refrigerant is dormant in the compressor 1, voltage command values Vu*, Vv*, Vw* to be supplied with the high-frequency AC voltage generating means 13 to the motor 8 are determined, and the PWM signal generating means 15 generates the PWM signal on the basis of the voltage command values Vu*, Vv*, Vw*.

Figure 2:
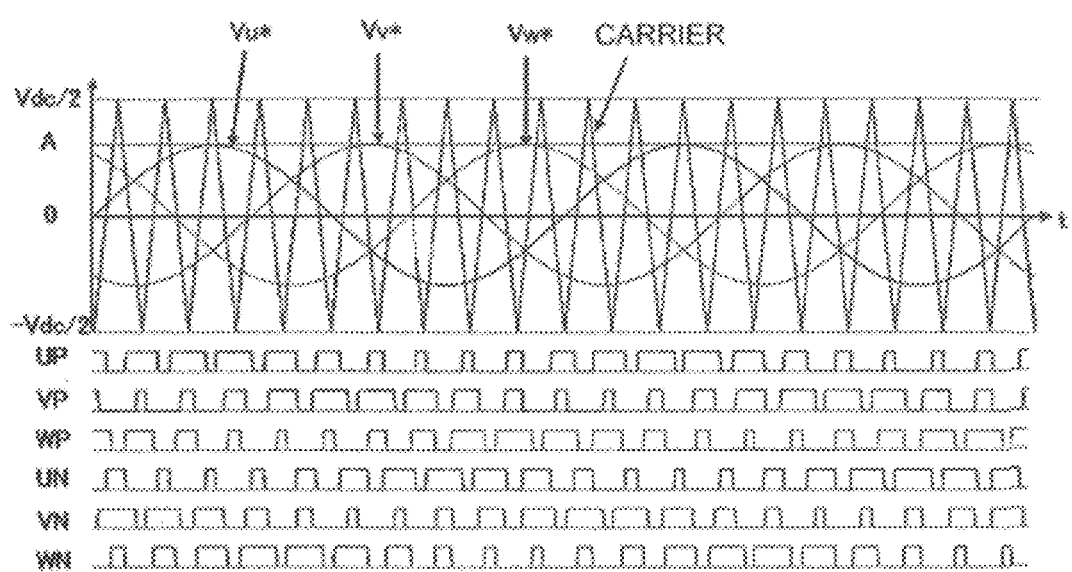
FIG. 2 is a drawing illustrating an operation of PWM signal generating means of each Embodiment of the present invention.

A signal generating method of the PWM signal generating means 15 will be described. FIG. 2 is a drawing showing I/O waveforms of the PWM signal generating means 15. For example, the voltage command signals Vu*, Vv*, Vw* are defined by the expressions shown below. Here, the reference symbol A denotes the voltage command amplitude, and θ denotes the voltage command phase.

[Math. 1]

$$V_u^* = A\cos\theta \quad (1)$$

$$V_v^* = A\cos\left[\theta - \frac{2}{3}\pi\right] \quad (2)$$

-continued $$V_w = A\cos\left[\theta + \frac{2}{3}\pi\right] \quad (3)$$

A voltage command signal obtained from expression (1) to expression (3) and a carrier signal having an amplitude Vdc/2 (Vdc here is the bus voltage detected by the bus voltage detecting means 10) at a predetermined frequency are compared and the PWM signals UP, VP, WP, UN, VN, WN are generated on the basis of the magnitude relation of each other.

It is needless to say that, other than using expression (1) to expression (3) to obtain voltage command signals Vu*, UV*, VW*, two-phase modulation, superimposed third-harmonic modulation, space vector modulation, or the like may be used without any problem.

Subsequently, the operation of Embodiment 1 will be described.

As for the inverter control means 11 configured as above, the dormant refrigerant detecting means 12 performs a determination of whether or not a dormant state of the refrigerant has occurred based on the temperature of the refrigeration cycle and information on the elapsed time while the operation of the compressor 1 is stopped, and when a dormant state is detected, the inverter control means 11 generates the PWM signal for preheating. At this time, the voltage commands Vu*, Vv*, Vw* are obtained by expression (1) to expression (3) with the high-frequency AC voltage generating means 13 using a voltage phase command 8 obtained by, using the integrator 14, integrating an amplitude A and a rotation speed command w* provided from the outside by means of user control. Subsequently, the obtained voltage commands Vu*, Vv*, Vw* are compared with a carrier in the PWM signal generating means 15 to obtain the PWM signal, and the switching elements 16a to 16f of the inverter 9 are driven to apply voltage to the motor 8.

Incidentally, generation of a rotation torque or vibrations is averted by operating at a frequency higher than the operating frequency at the time of compression operation (up to 1 kHz) and applying a high-frequency voltage to the motor 8, and efficient heating of the motor 8 is achieved by using iron loss of the motor 8 caused by application of a high-frequency voltage and copper loss by current flowing through a coil. Liquid refrigerant stagnating in the compressor 1 is heated and evaporated by heating of the motor 8, and leaks out of the compressor 1. The dormant refrigerant detecting means 12 discriminates the restoration of a normal state from the dormant state by determining whether the refrigerant has been leaked out by a predetermined amount or for a predetermined period, and ends heating of the motor 8.

In addition, if the frequency of the above-mentioned high-frequency voltage to be applied is equal to or higher than 14 kHz, the vibration sound of the iron core of the motor 8 will be substantially out of audible range, in which reduction of the noise is effectively achieved. When the compressor 1 employs an interior permanent magnet motor, since the surface of a rotor having an interlinkage of high-frequency magnetic flux also serves as a heat-generating portion, increase in refrigerant contact surface area and rapid heating of the compression mechanism 7 are achieved, in which efficient heating of the refrigerant is enabled.

The winding direction of the stator coil of the motor 8 begins at a phase terminal side and ends at a neutral point side. The heating is performed through two losses, namely, copper loss and iron loss of the coil by applying voltage to the motor 8, in the case of a concentrated winding motor in which the coil end of the stator is small and the coil resistance is low, the coil resistance is small and hence the amount of heat by the copper loss is small. Accordingly, in order to increase the heat value, a large amount of current needs to flow through the coil, which increases the amount of current flowing through the inverter 9 and, consequently, the inverter loss becomes excessively large.

According to Embodiment 1, since heating is performed by applying high-frequency voltage, inductance increases and the coil impedance increases due to the high frequency, and hence, the current flowing through the coil decreases. Accordingly, the copper loss drops, but the iron loss increases corresponding to the applied high frequency voltage, achieving effective heating. In addition, since the current flowing through the coil is small, the loss of the inverter 9 is reduced, enabling heating with less loss.

The compressor 1 of a scroll mechanism faces a risk of damage caused by excessive stress exerted on the compression mechanism when liquid refrigerant enters therein due to difficulty in achieving relief of high pressure in the compression chamber. According to Embodiment 1, the application of the high-frequency voltage enables effective heating by the iron loss of the motor 8, and thus high efficiency heating of the interior of the compressor 1 is possible, and since the amount of liquid refrigerant in the compressor 1 is significantly reduced by evaporation and leaking out therefrom, damage to the compressor 1 is effectively prevented.

In addition, in a case of a heating apparatus which exceeds 10 kHz in frequency and 50 W in output, there is a restriction under Article 100 of the Radio Act, and so by adjusting, in advance, the amplitude of the voltage command so as not to exceed 50 W or by detecting the flowing current and performing feedback so as not to exceed 50 W, heating of the compressor 1 meeting the Radio Act is obtained.

Embodiment 2

In the case of a general inverter, the upper limit of a carrier frequency is restricted by the switching speed of the switching element of the inverter 9, and is on the order of 20 kHz in the case of a general IGBT. Therefore, it is difficult to output a high-frequency voltage that is equal to or higher than the carrier frequency, which is a carrier wave, and when the frequency of the high-frequency voltage is on the order of one-tenth the carrier frequency, accuracy of the waveform output of the high-frequency voltage decreases, and adverse effect such as superimposition of direct current may occur. For example, assuming that the carrier frequency is 20 kHz, the frequency of the high-frequency voltage will be 2 kHz, that is, one tenth thereof, which is within the range of audible frequencies, and hence causes concern about noise worsening.

Figure 3:
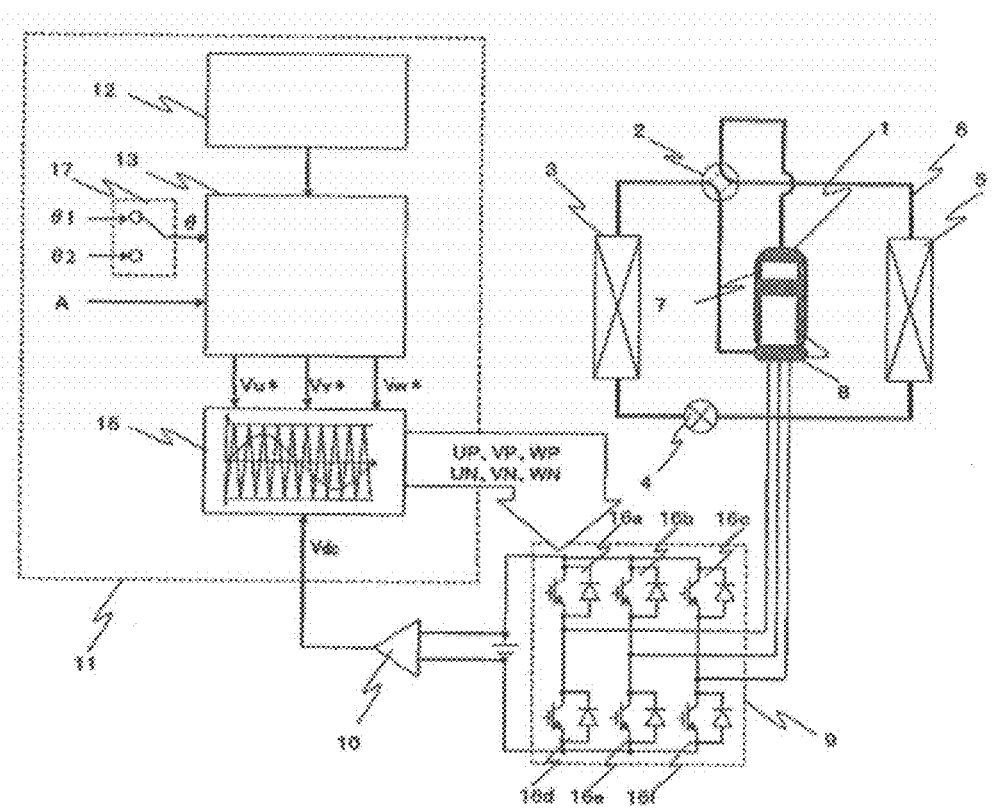
FIG. 3 is a drawing showing a configuration of the air-conditioning apparatus according to Embodiment 2 of the present invention.

An object of Embodiment 2 is to solve the above-described problem, and its content will be described below. FIG. 3 is a drawing showing a configuration of the air-conditioning apparatus according to Embodiment 2 of the present invention. Since there is no difference from Embodiment 1 other than that the integrator 14 is replaced with phase switching means 17, descriptions are omitted where the same reference numerals are assigned, and only different points will be described.

In Embodiment 1, the phase θ of the voltage command was obtained with the integrator 14 by integrating the rotation speed command ω* given from the outside, but here, two phases θ1 and θ2 given from the outside will be switched alternately with the phase switching means 17.

As regards the timing of the phase switching by the phase switching means 17, an output of the PWM signal synchronizing with the carrier can be produced by timing the switching at the peak or bottom or peak and bottom of the carrier.

Subsequently, the operation of Embodiment 2 will be described.

As for the inverter control means 11 configured as above, the dormant refrigerant detecting means 12 performs a determination of whether or not a dormant state of the refrigerant has occurred while the operation of the compressor 1 is stopped based on the temperature of the refrigeration cycle and the information on the elapsed time, and when a dormant state is detected, the inverter control means 11 generates the PWM signal for preheating. At this time, the voltage commands Vu*, Vv*, Vw* are obtained with the high-frequency AC voltage generating means 13 by expression (1) to expression (3) using θ obtained with the phase switching means 17 selecting either one of the phases θ1 and θ2 provided from the outside by means of user control or the like, and by using the amplitude A obtained from the outside by means of user control or the like. Subsequently, the obtained voltage commands Vu*, Vv*, Vw* are compared with the carrier in the PWM signal generating means 15 to obtain the PWM signal, and the switching elements 16a to 16f of the inverter 9 are driven to apply voltage to the motor 8.

Figure 4:
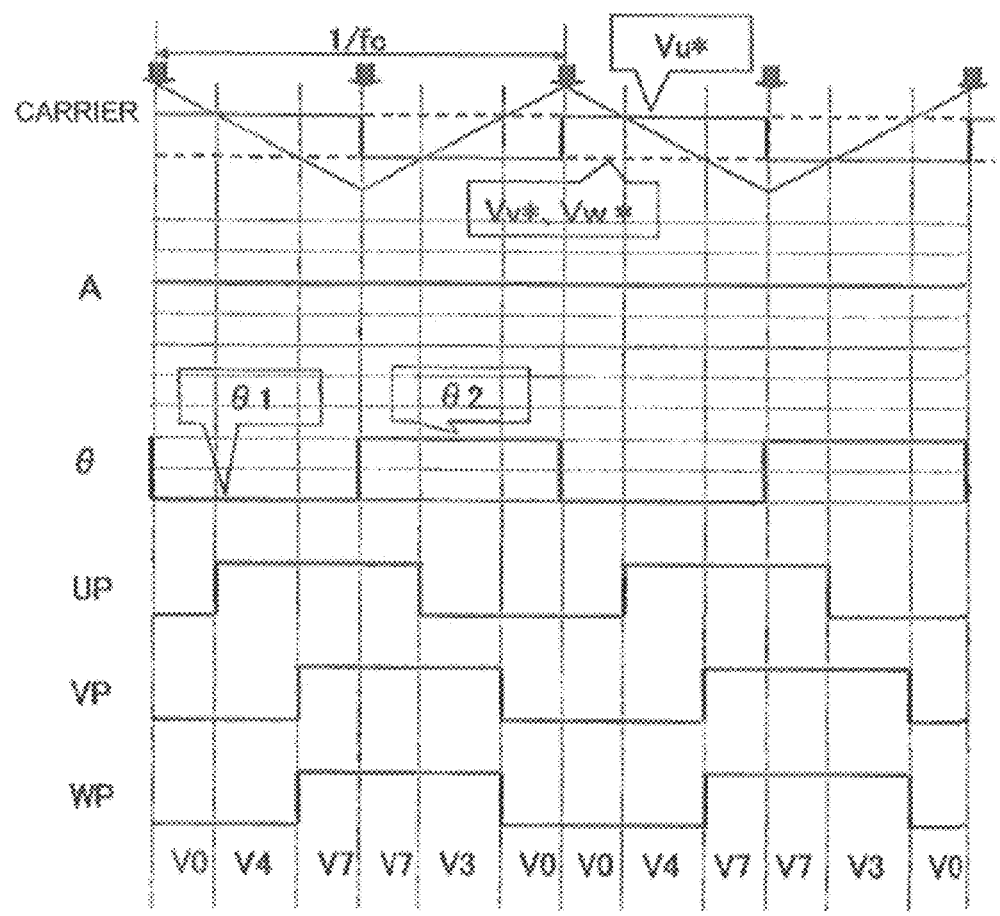
FIG. 4 is a drawing illustrating an operation of inverter control means in Embodiment 2 of the present invention.

With the operation as described above, for example, if θ1=0 [deg] and θ2=180 [deg] are set, the PWM signal, which drives the switching elements 16a to 16f in the timing chart shown in FIG. 4, changes and the voltage vector changes in the order V0 (UP=VP=WP=0)→V4 (UP=1, VP=WP=0)→V7 (UP=VP=WP=1)→V3(UP=0, VP=WP=1)→V0(UP=VP=WP=0) . . . .

Figure 5:
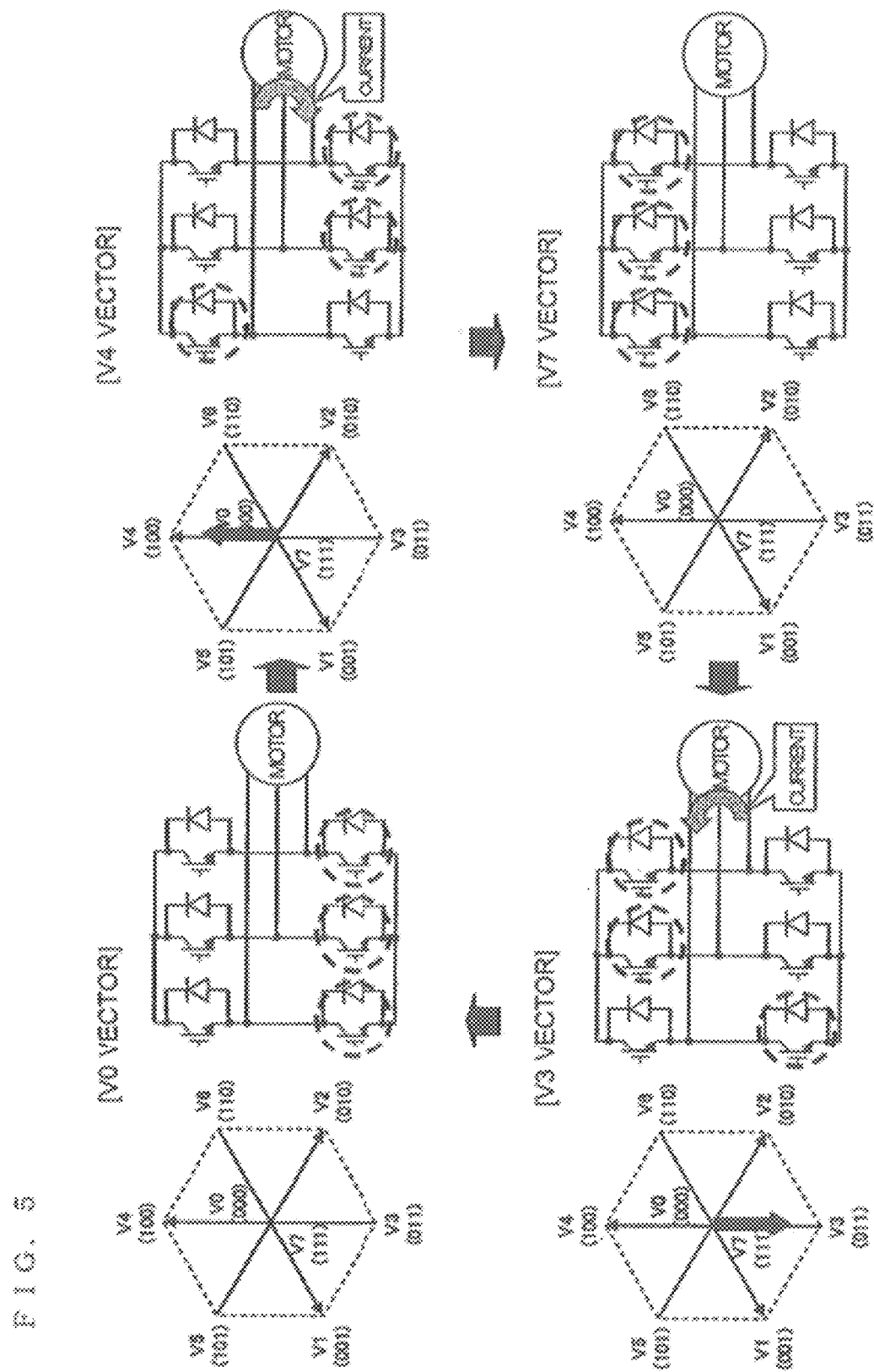
FIG. 5 is an example of an inverter operation in Embodiment 2 of the present invention.
Figure 6:
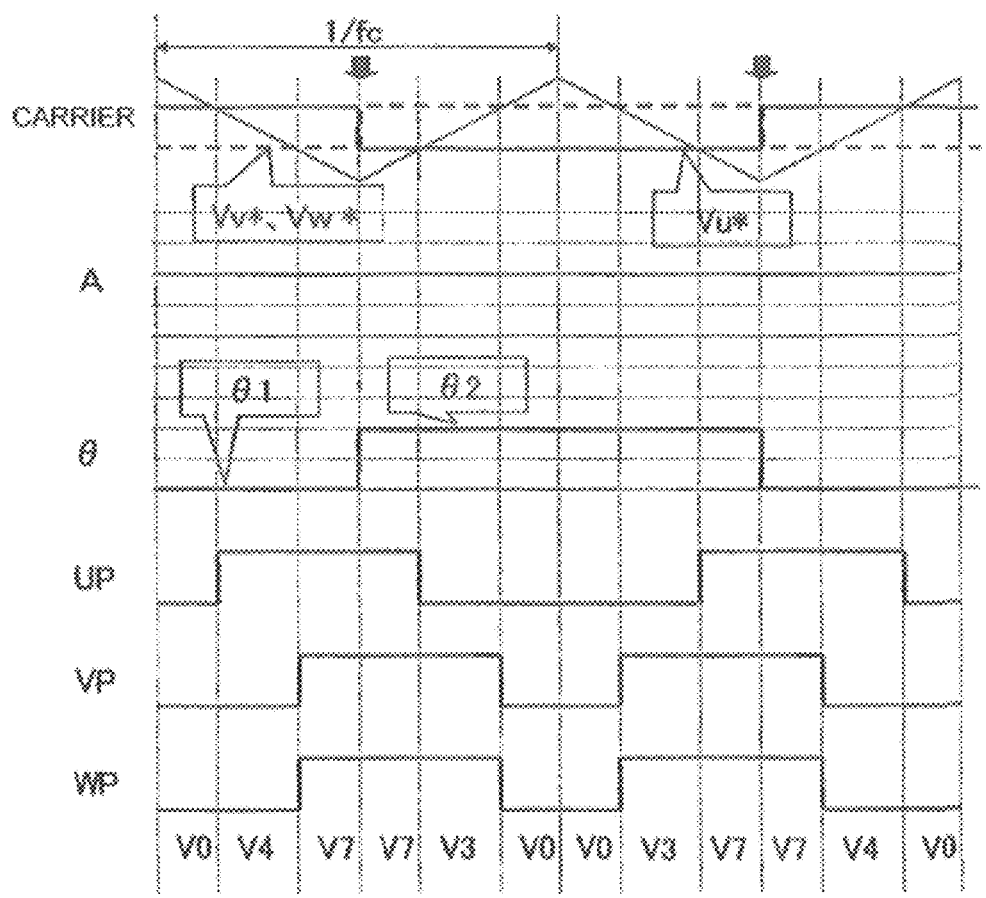
FIG. 6 is a drawing illustrating an operation of another inverter control means in Embodiment 2 of the present invention.

Then, when the V4 vector is applied, a current of +Iu flows, and when the V3 vector is applied, a current of −Iu flows through the coil of the motor 8 as shown in FIG. 5. The vector patterns V4 and V3 appear between one carrier cycle (1/fc) as shown in FIG. 4, and hence generation of an AC current synchronous with the carrier frequency fc is yielded.

When control is performed so as to switch the phase between θ1 and θ2 at the bottom of the carrier, the V4 vector and V3 vector are applied in a 2-carrier cycle such as V0→V4→V7→V7→V3→V0→V0→V3→V7→V7→V4→V0 . . . , and hence the AC voltage at a ½ carrier frequency can be applied to the coil of the motor 8.

Incidentally, generation of a rotation torque or vibrations is averted by operating at a frequency higher than the operating frequency at the time of compression operation (up to 1 kHz) and applying a high-frequency voltage to the motor 8, and efficient heating of the motor 8 is achieved by using iron loss of the motor 8 caused by application of a high-frequency voltage and copper loss generated by current flowing through a coil. Liquid refrigerant stagnating in the compressor 1 is heated and evaporated by heating of the motor 8, and leaks out of the compressor 1. The dormant refrigerant detecting means 12 discriminates the restoration of a normal state from the dormant state by determining whether the refrigerant has been leaked out by a predetermined amount or for a predetermined period, and ends heating of the motor 8.

Based on the switching speed of the status-quo IGBT in which the upper limit of the carrier frequency is on the order of 20 kHz, an AC voltage of 20 kHz can be applied to the motor 8 by switching the phase θ at the peak and bottom of the carrier when the carrier frequency is set to 20 kHz. Accordingly, with the frequency that has been raised to a high level, the iron loss is generated and hence efficient heating is achieved. Furthermore, the current flowing through the inverter can also be reduced by increase in coil impedance of the motor 8 and reduction of inverter loss is achieved, and, as a result, the emission of $CO_2$ can be restrained, which is effective as a countermeasure against global warming.

In addition, if the frequency of the above-mentioned high-frequency voltage to be applied is equal to or higher than 14 kHz, the vibration sound of the iron core of the motor 8 will be substantially out of audible range, in which reduction of noise is effectively achieved. When the compressor 1 employs an interior permanent magnet motor, since the surface of a rotor having an interlinkage of high-frequency magnetic flux also serves as a heat-generating portion, increase in refrigerant contact surface area and rapid heating of the compression mechanism 7 are achieved, in which efficient heating of the refrigerant is enabled.

The heating is performed through two losses, namely, copper loss and iron loss of the coil by applying voltage to the motor 8, in the case of a concentrated winding motor in which the coil end is small and the coil resistance is low, the coil resistance is small and hence the amount of heat by the copper loss is small. Accordingly, in order to increase the heat value, a large amount of current needs to flow through the coil, which increases the amount of current flowing through the inverter 9 and, consequently, the inverter loss becomes excessively large.

According to Embodiment 2, since heating is performed by applying high-frequency voltage, inductance increases and the coil impedance increases due to the high frequency, and hence, the current flowing through the coil decreases. Accordingly, the copper loss drops, but the iron loss increases corresponding to the applied high frequency voltage, achieving effective heating. In addition, since the current flowing through the coil is small, the loss of the inverter 9 is reduced, enabling heating with less loss.

The compressor 1 of a scroll mechanism faces a risk of damage caused by excessive stress exerted on the compression mechanism 7 when liquid refrigerant enters therein due to difficulty in achieving relief of high pressure in the compression chamber.

According to Embodiment 2, the application of the high-frequency voltage enables effective heating by the iron loss of the motor 8, and thus high efficiency heating of the interior of the compressor 1 is possible, and since the amount of liquid refrigerant in the compressor 1 is significantly reduced by the evaporation and leaking out therefrom, damage to the compressor 1 is effectively prevented.

In addition, in a case of a heating apparatus which exceeds 10 kHz in frequency and 50 W in output, there is a restriction under Article 100 of the Radio Act, and so by adjusting, in advance, the amplitude of the voltage command so as not to exceed 50 W or by detecting the flowing current and performing feedback so as not to exceed 50 W, heating of the compressor 1 meeting the Radio Act is obtained.

Embodiment 3

Since an IPM (Interior Permanent Magnet) motor has an dependency on the rotational position of the winding inductance, and the impedance of the winding inductance is expressed by electrical angle frequency ω×inductance value, when the inductance value changes on the basis of the rotor position as shown in FIG. 7, the impedance changes, which creates a problem in that the current flowing through the motor coil may fluctuate even when the same voltage is applied.

Figure 8:
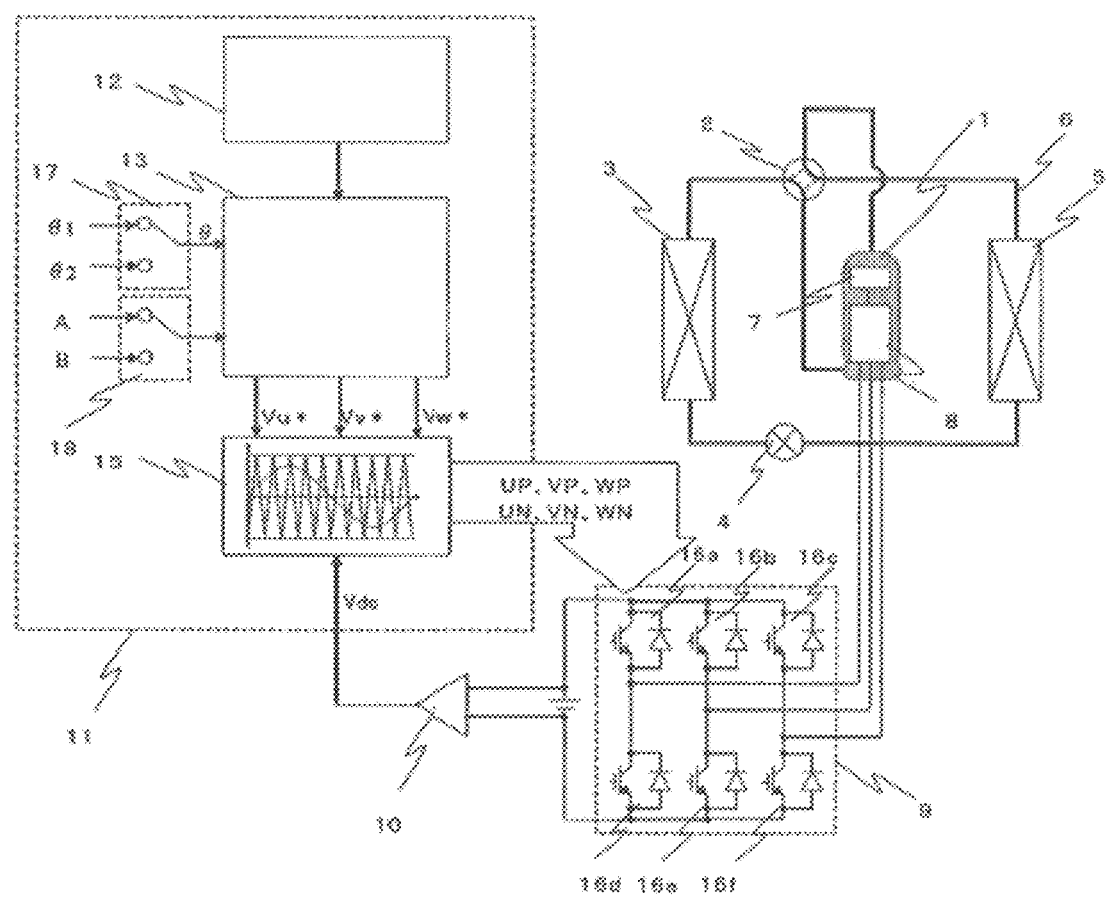
FIG. 8 is a drawing showing a configuration of the air-conditioning apparatus according to Embodiment 3 of the present invention.

An object of Embodiment 3 is to solve the above-described problem, and its content will be described below. FIG. 8 is a drawing showing a configuration of the air-conditioning apparatus according to Embodiment 3 of the present invention. Since there is no difference from Embodiment 2 other than that amplitude switching means 18 is added, descriptions are omitted where the same reference numerals are assigned, and only different points will be described.

In Embodiment 2, a method is employed in which the AC voltage at the carrier frequency or ½ carrier frequency is applied with the phase switching means 17 selecting one of θ1 and θ2 while synchronizing the phase θ of the voltage command with the carrier, but since the amplitude A of the voltage command is constant, only the AC component could be applied.

Accordingly, in Embodiment 3, a DC component is superimposed on the AC voltage to be applied by switching the amplitude A and an amplitude B provided from the outside by means of user control or the like with the amplitude switching means 18. Accordingly, the compressor 1 can be heated by the AC voltage while fixing the rotor with the DC component.

Subsequently, the operation of Embodiment 3 will be described.

As for the inverter control means 11 configured as above, the dormant refrigerant detecting means 12 performs a determination of whether or not a dormant state of the refrigerant has occurred based on the temperature of the refrigeration cycle and information on the elapsed time while the operation of the compressor 1 is stopped, and when a dormant state is detected, the inverter control means 11 generates the PWM signal for preheating. At this time, the voltage commands Vu*, Vv*, Vw* are obtained by expression (1) to expression (3) with the high-frequency AC voltage generating means 13 while the amplitude A and the amplitude B are switched by the amplitude switching means 18 and, at the same time, the phase θ is obtained by the phase switching means 17. Subsequently, the obtained voltage commands Vu*, Vv*, Vw* are compared with a carrier in the PWM signal generating means 15 to obtain the PWM signal, and the switching elements 16a to 16f of the inverter 9 are driven to apply voltage to the motor 8.

Figure 9:
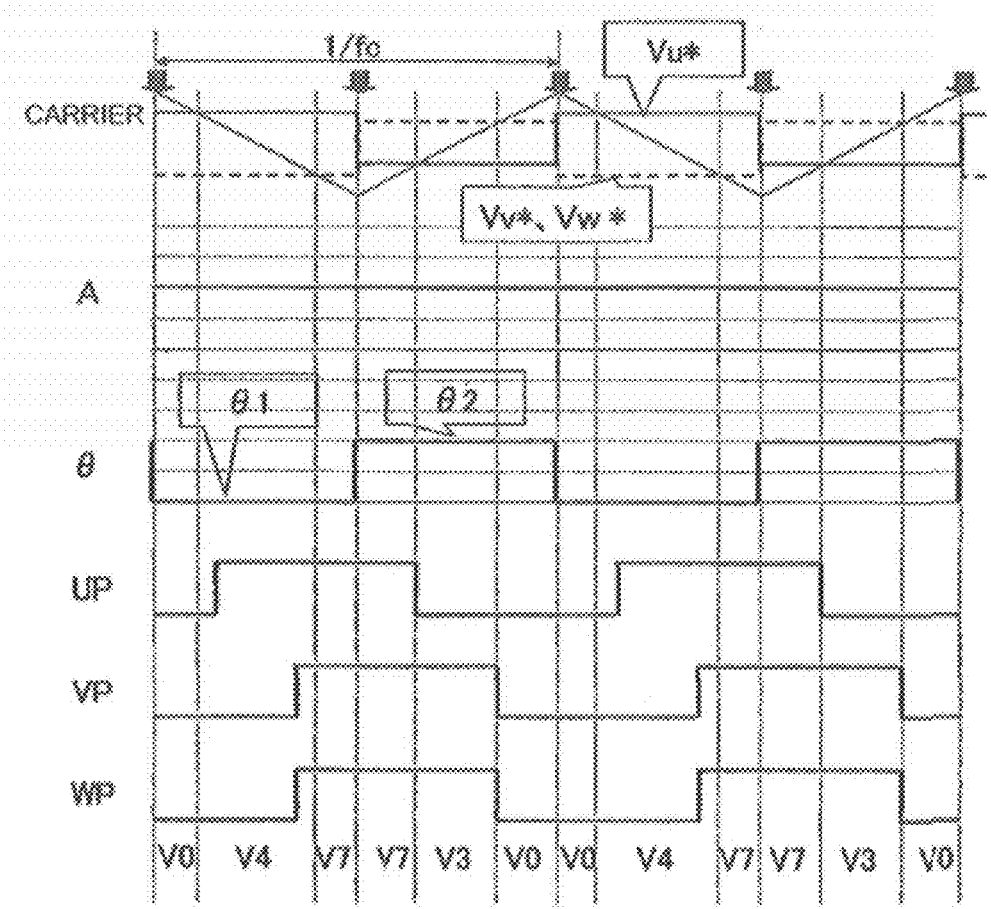
FIG. 9 is a drawing illustrating an operation of the inverter control means in Embodiment 3 of the present invention.

With the operation as described above, the amplitude is switched at every control generated at the peak and bottom of the carrier as shown in FIG. 9 (in the example shown in FIG. 9, the phase and the amplitude are switched to the phase θ1 and the amplitude A at every peak of the carrier, and to the phase θ2 and the amplitude B at every bottom of the carrier) and, consequently, the ratio of the V4 vector and the V3 vector is changed. For example, by setting the ratio of V4 larger than that of V3, voltage in the direction of a U-phase is supplied by a large amount and voltage in the direction of a –U-phase is supplied by a small amount, so that the AC voltage offset in the normal direction can be supplied.

Consequently, by fixing the rotor position by DC excitation by the DC component generated by the offset and applying the AC voltage, heating of the compressor 1 always at a desired rotor position is enabled.

Incidentally, generation of a rotation torque or vibrations is averted by operating at a frequency higher than the operating frequency at the time of compression operation (up to 1 kHz) and applying a high-frequency voltage to the motor 8, and efficient heating of the motor 8 is achieved by using iron loss of the motor 8 caused by application of a high-frequency voltage and copper loss generated by current flowing through a coil. Liquid refrigerant stagnating in the compressor 1 is heated and evaporated by heating of the motor 8, and leaks out of the compressor 1. The dormant refrigerant detecting means 12 discriminates the restoration of a normal state from the dormant state by determining whether the refrigerant has been leaked out by a predetermined amount or for a predetermined period, and ends heating of the motor 8.

Based on the switching speed of the status-quo IGBT in which the upper limit of the carrier frequency is on the order of 20 kHz, an AC voltage of 20 kHz can be applied to the motor 8 by switching the phase θ at the peak and bottom of the carrier when the carrier frequency is set to 20 kHz. Accordingly, with the frequency that has been raised to a high level, the iron loss is generated and hence efficient heating is achieved. Furthermore, the current flowing through the inverter can also be reduced by increase in coil impedance of the motor 8 and reduction of inverter loss is achieved, and, as a result, the emission of $CO^2$ can be restrained, which is effective as a countermeasure against global warming.

In addition, if the frequency of the above-mentioned high-frequency voltage to be applied is equal to or higher than 14 kHz, the vibration sound of the iron core of the motor 8 will be substantially out of audible range, in which reduction of the noise is effectively achieved. When the compressor 1 employs an interior permanent magnet motor, since the surface of a rotor having an interlinkage of high-frequency magnetic flux also serves as a heat-generating portion, increase in refrigerant contact surface area and rapid heating of the compression mechanism 7 are achieved, in which efficient heating of the refrigerant is enabled.

The heating is performed through two losses, namely, copper loss and iron loss of the coil by applying voltage to the motor 8, in the case of a concentrated winding motor in which the coil end is small and the coil resistance is low, the coil resistance is small and hence the amount of heat by the copper loss is small. Accordingly, in order to increase the heat value, a large amount of current needs to flow through the coil, which increases the amount of current flowing through the inverter 9 and, consequently, the inverter loss becomes excessively large.

According to Embodiment 3, since heating is performed by applying high-frequency voltage, inductance increases and the coil impedance increases due to the high frequency, and hence, the current flowing through the coil decreases. Accordingly, the copper loss drops, but the iron loss increases corresponding to the applied high frequency voltage, achieving effective heating. In addition, since the current flowing through the coil is small, the loss of the inverter 9 is reduced, enabling heating with less loss.

The compressor 1 of a scroll mechanism faces a risk of damage caused by excessive stress exerted on the compression mechanism 7 when liquid refrigerant enters therein due to difficulty in achieving relief of high pressure in the compression chamber.

According to Embodiment 3, the application of the high-frequency voltage enables effective heating by the iron loss of the motor 8, and thus high efficiency heating of the interior of the compressor 1 is possible, and since the amount of liquid refrigerant in the compressor 1 is significantly reduced by the evaporation and leaking out therefrom, damage to the compressor 1 is effectively prevented.

In addition, in a case of a heating apparatus which exceeds 10 kHz in frequency and 50 W in output, there is a restriction under Article 100 of the Radio Act, and so by adjusting, in advance, the amplitude of the voltage command so as not to exceed 50 W or by detecting the flowing current and performing feedback so as not to exceed 50 W, heating of the compressor 1 meeting the Radio Act is obtained.

Embodiment 4

Figure 10:
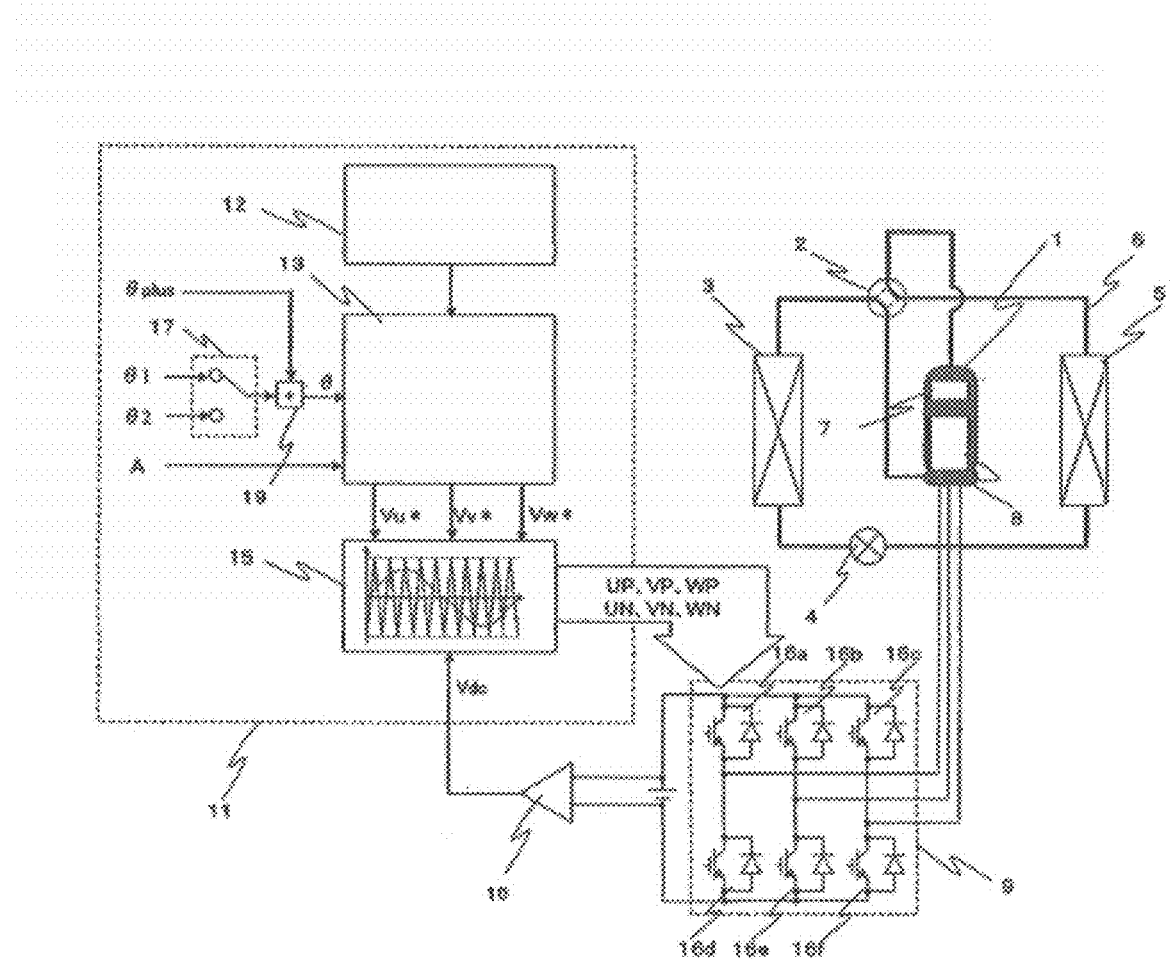
FIG. 10 is a drawing showing a configuration of the air-conditioning apparatus according to Embodiment 4 of the present invention.

Another method for solving the change of the inductance value on the basis of the rotor position as shown in FIG. 7 will be described. FIG. 10 is a drawing showing a configuration of the air-conditioning apparatus according to Embodiment 4 of the present invention. Since there is no difference from other Embodiments other than that an adder 19 is added, descriptions are omitted where the same reference numerals are assigned, and only different points will be described.

In Embodiment 2, the method is employed in which the AC voltage at the carrier frequency or the ½ carrier frequency is applied by selecting one of θ1 and θ2 while synchronizing the phase θ of the voltage command by the phase switching means 17 with the carrier, since a current carrying phase is limited to the two phases θ1 and θ2 having a phase difference with respect to θ1 by 180 degrees, the current value when the same voltage is applied is different on the basis of the rotor position described above and hence a power more than necessary may be input.

Therefore, in Embodiment 4, a changed phase θplus is added to θ1 and θ2 with the adder 19. Accordingly, by changing the phase θ with the elapse of time, uniform heating of the compressor 1 is achieved irrespective of the rotor position.

Subsequently, the operation of Embodiment 4 will be described.

As for the inverter control means 11 configured as above, the dormant refrigerant detecting means 12 performs a determination of whether or not a dormant state of the refrigeration has occurred based on the temperature of the refrigeration cycle and information on the elapsed time while the operation of the compressor 1 is stopped, and when a dormant state is detected, the inverter control means 11 generates the PWM signal for preheating. At this time, the voltage commands Vu\*, Vv\*, Vw\* are obtained by expression (1) to expression (3) with the high-frequency AC voltage generating means 13 while a phase θ is obtained by adding the changed phase θplus to the amplitude A and an output of the phase switching means 17 with the adder 19. Subsequently, the obtained voltage commands Vu\*, Vv\*, Vw\* are compared with a carrier in the PWM signal generating means 15 to obtain the PWM signal, and the switching elements 16a to 16f of the inverter 9 are driven to apply voltage to the motor 8.

Figure 11:
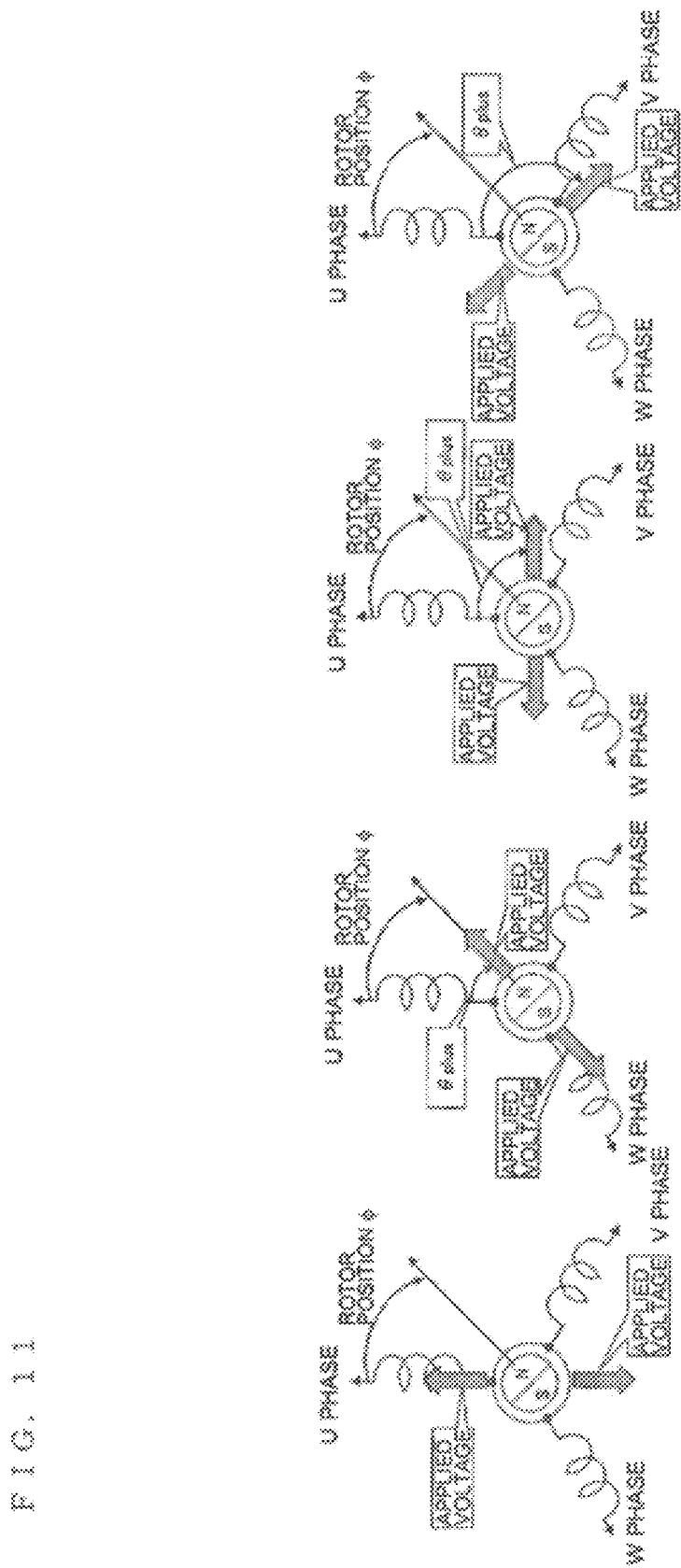
FIG. 11 is a drawing showing an operation according to Embodiment 4 of the present invention.

By the operation described thus far, by changing θplus in sequence of 0 deg→45 deg→90 deg→135 deg→ . . . with the elapse of time as shown in FIG. 11, the phase θ of the voltage command is changed in sequence of 0 deg→180 deg→45 deg→225 deg→90 deg→270 deg→135 deg→315 deg→ . . . and, in this manner, the current carrying phase can be changed while applying the high frequency AC voltage, so that heating of the compressor 1 without dependence on the rotor position is enabled.

Incidentally, generation of a rotation torque or vibrations is averted by operating at a frequency higher than the operating frequency at the time of compression operation (up to 1 kHz) and applying a high-frequency voltage to the motor 8, and efficient heating of the motor 8 is achieved by using iron loss of the motor 8 caused by application of a high-frequency voltage and copper loss generated by current flowing through a coil. Liquid refrigerant stagnating in the compressor 1 is heated and evaporated by heating of the motor 8, and leaks out of the compressor 1. The dormant refrigerant detecting means 12 discriminates the restoration of a normal state from the dormant state by determining whether the refrigerant has been leaked out by a predetermined amount or for a predetermined period, and ends heating of the motor 8.

Based on the switching speed of the status-quo IGBT in which the upper limit of the carrier frequency is on the order of 20 kHz, an AC voltage of 20 kHz can be applied to the motor 8 by switching the phase θ at the peak and bottom of the carrier when the carrier frequency is set to 20 kHz. Accordingly, with the frequency that has been raised to a high level, the iron loss is generated and hence efficient heating is achieved. Furthermore, the current flowing through the inverter can also be reduced by increase in coil impedance of the motor 8 and reduction of inverter loss is achieved, and, as a result, the emission of $CO^2$ can be restrained, which is effective as a countermeasure against global warming.

However, when θplus is changed, since a low frequency component according to the changed frequency is superimposed on the high-frequency AC voltage, there is a risk of generation of noise. Hence, by setting θplus so that the low-frequency component does not exceed 20 Hz which is out of the range of audible frequencies, the compressor 1 can be heated uniformly and the reduction of the noise is also possible.

In addition, if the frequency of the above-mentioned high-frequency voltage to be applied is equal to or higher than 14 kHz, the vibration sound of the iron core of the motor 8 will be substantially out of audible range, in which reduction of the noise is effectively achieved. When the compressor 1 employs an interior permanent magnet motor, since the surface of a rotor having an interlinkage of high-frequency magnetic flux also serves as a heat-generating portion, increase in refrigerant contact surface area and rapid heating of the compression mechanism 7 are achieved, in which efficient heating of the refrigerant is enabled.

The heating is performed through two losses, namely, copper loss and iron loss of the coil by applying voltage to the motor 8, in the case of a concentrated winding motor in which the coil end is small and the coil resistance is low, the coil resistance is small and hence the amount of heat by the copper loss is small. Accordingly, in order to increase the heat value, a large amount of current needs to flow through the coil, which increases the amount of current flowing through the inverter 9 and, consequently, the inverter loss becomes excessively large.

According to Embodiment 4, since heating is performed by applying high-frequency voltage, inductance increases and the coil impedance increases due to the high frequency, and hence, the current flowing through the coil decreases. Accordingly, the copper loss drops, but the iron loss increases corresponding to the applied high frequency voltage, achieving effective heating. In addition, since the current flowing through the coil is small, the loss of the inverter 9 is reduced, enabling heating with less loss.

The compressor 1 of a scroll mechanism faces a risk of damage caused by excessive stress exerted on the compression mechanism 7 when liquid refrigerant enters therein due to difficulty in achieving relief of high pressure in the compression chamber.

According to Embodiment 4, the application of the high-frequency voltage enables effective heating by the iron loss of the motor 8, and thus high efficiency heating of the interior of the compressor 1 is possible, and since the amount of liquid refrigerant in the compressor 1 is significantly reduced by the evaporation and leaking out therefrom, damage to the compressor 1 is effectively prevented.

In addition, in a case of a heating apparatus which exceeds 10 kHz in frequency and 50 W in output, there is a restriction under Article 100 of the Radio Act, and so by adjusting, in advance, the amplitude of the voltage command so as not to exceed 50 W or by detecting the flowing current and performing feedback so as not to exceed 50 W, heating of the compressor 1 meeting the Radio Act is obtained.

INDUSTRIAL APPLICABILITY

As examples of utilization methods, the present invention may be applied not only to the air-conditioning apparatus as a matter of course, but also to refrigeration cycle using an inverter compressor such as a refrigerator, a freezer, a heat pump water heater, and so on.

The products described above are collectively designated as apparatus.

REFERENCE SIGNS LIST

1 compressor, 2 four-way valve, 3 outdoor heat exchanger, 4 expansion valve, 5 indoor heat exchanger, 6 refrigerant piping, 7 compression mechanism, 8 motor, 9 inverter, 10 bus voltage detecting means, 11 inverter control means, 12 dormant refrigerant detecting means, 13 high-frequency AC voltage generating means, 14 integrator, 15 PWM signal generating means, 16, 16a-16f switching element, 17 phase switching means, 18 amplitude switching means, 19 adder

The invention claimed is:

1. An air-conditioning apparatus comprising:
a compressor to compress a refrigerant;
a motor to drive the compressor;
an inverter to apply a desired voltage to the motor;
an inverter controller to control the inverter; and
a bus voltage detector to detect a bus voltage that is a power source of the inverter,
the inverter controller including:
a dormant refrigerant detector to detect a dormant state of refrigerant in the compressor;
a high-frequency AC voltage generator to output a high-frequency AC voltage command when the motor is not undergoing a compression operation which has a frequency that is higher than a range of operating frequencies when the motor is undergoing the compression operation to three phases of a coil of the motor on the basis of an output of the dormant refrigerant detector and an amplitude and a phase input from outside of the high-frequency AC voltage generator; and
a pulse width modulation (PWM) signal generator to cause the inverter to generate a high-frequency AC voltage by generating and outputting a PWM signal to the inverter on the basis of the high-frequency AC voltage command output by the high-frequency AC voltage generator and an output of the bus voltage detector,
wherein upon an output of the PWM signal from the PWM signal generator to the inverter, the refrigerant in the compressor is heated by iron loss and copper loss in the motor.

2. The air-conditioning apparatus of claim 1, wherein the high-frequency AC voltage generator integrates a rotation speed command of the motor that is inputted from the outside of the high-frequency AC voltage generator to calculate the phase.

3. The air-conditioning apparatus of claim 1, the high-frequency AC voltage generator further comprising:
a phase switch to input a first phase from the outside of the high-frequency AC voltage generator and a second phase that is different from the first phase by substantially 180 degrees, and to select either the first phase or the second phase as a third phase,
wherein the PWM signal generator compares the three-phase high-frequency AC voltage command provided from the high-frequency AC voltage generator and a carrier signal and generates the PWM signal by switching a first voltage vector, constituted by the first phase selected by the phase switch and the amplitude, and a second voltage command vector, constituted by the second phase and the amplitude, timed at a peak and bottom of the carrier signal.

4. The air-conditioning apparatus of claim 3, further comprising an adder adding a fourth phase which changes with elapse of time to an output of the phase switch.

5. The air-conditioning apparatus of claim 1, the high-frequency AC voltage generator further comprising:
a phase switch to input a first phase from the outside of the high-frequency AC voltage generator and a second phase that is different from the first phase by substantially 180 degrees, and to select either the first phase or the second phase as a third phase; and
an amplitude switch to select either a first amplitude from the outside of the high-frequency AC voltage generator or a second amplitude which can generate a braking torque that fixes the rotor position of the motor as a third amplitude, the air-conditioning apparatus wherein
the PWM signal generator compares the three-phase high-frequency AC voltage command provided from the high-frequency AC voltage generator with a carrier signal and generates the PWM signal to cause the inverter to generate the high-frequency AC voltage superimposed on a DC component by switching a first voltage command vector, constituted by the first phase selected by the phase switch and the first amplitude, and a second voltage command vector, constituted by the second phase and the second amplitude, timed at a peak and bottom of the carrier signal.

6. The air-conditioning apparatus of claim 1, wherein a frequency of the high-frequency AC voltage is not higher than an upper limit value of a switching frequency of a switching element which constitutes the inverter.

7. The air-conditioning apparatus of claim 1, the high-frequency AC voltage generator further comprising:
a phase switch to input a first phase from the outside of the high-frequency AC voltage generator and a second phase that is different from the first phase by substantially 180 degrees and to select either the first phase or the second phase as a third phase, the air-conditioning apparatus wherein
the PWM signal generator compares the three-phase high-frequency AC voltage command provided from the high-frequency AC voltage generator with a carrier signal and generates the PWM signal to cause the inverter to generate the high-frequency AC voltage by switching a first voltage command vector, constituted by the first phase selected by the phase switch and the amplitude, and a second voltage command vector, constituted by the second phase and the amplitude, timed at an odd-numbered peak or bottom, and an even-numbered peak or bottom of the carrier signal.

8. The air-conditioning apparatus of claim 7, wherein an upper limit frequency of the high-frequency AC voltage is not higher than half of an upper limit value of a switching frequency of a switching element which constitutes the inverter.

9. The air-conditioning apparatus of claim 1, the high-frequency AC voltage generator further comprising:
a phase switch to input a first phase from the outside of the high-frequency AC voltage generator and a second phase that is different from the first phase by substantially 180 degrees and to select either the first phase or the second phase as a third phase; and
an amplitude switch to select either a first amplitude from the outside of the high-frequency AC voltage generator or a second amplitude which can generate a braking torque that fixes the rotor position of the motor as a third amplitude, the air-conditioning apparatus wherein
the PWM signal generator compares the three-phase high-frequency AC voltage command provided from the high-frequency AC voltage generator with a carrier signal and generates the PWM signal to cause the inverter to generate the high-frequency AC voltage superimposed on a DC component by switching a first voltage vector, constituted by the first phase selected by the phase switch and the first amplitude selected by the amplitude switch, and a second voltage command vector, constituted by the second phase and the second amplitude, timed at an odd-numbered peak or bottom, and an even-numbered peak or bottom of the carrier signal.

10. The air-conditioning apparatus of claim 1, wherein a lower limit frequency of the high-frequency AC voltage is higher than an operating frequency at the time of the compression operation of the motor.

11. The air-conditioning apparatus of claim 1, wherein a rotor of the motor has an interior permanent magnet (IPM) structure.

12. The air-conditioning apparatus of claim 1, wherein a stator coil of the motor is a concentrated winding.

13. The air-conditioning apparatus of claim 1, wherein a stator coil of the motor has a beginning of winding at a phase terminal side of the motor and an end of winding at a neutral point side.

14. The air-conditioning apparatus of claim 1, wherein the dormant refrigerant detector detects the dormant state of the refrigerant of the compressor on the basis of a predetermined time that has elapsed while a temperature of the refrigeration cycle is at or lower than a predetermined temperature.

15. The air-conditioning apparatus of claim 1, wherein the compressor is of a scroll type.

16. The air-conditioning apparatus of claim 1, wherein when a frequency of the high-frequency AC voltage exceeds 10 kHz, an input power of the motor is controlled to be equal to or lower than 50 W.

* * * * *